US012738873B2

(12) United States Patent
Shiraki et al.

(10) Patent No.: US 12,738,873 B2
(45) Date of Patent: Sep. 15, 2026

(54) FREQUENCY CHARACTERISTIC MEASUREMENT APPARATUS AND FREQUENCY CHARACTERISTIC MEASUREMENT METHOD

(71) Applicant: Panasonic Intellectual Property Management Co., Ltd., Osaka (JP)

(72) Inventors: Yuta Shiraki, Osaka (JP); Hiroshi Fujiwara, Osaka (JP); Toru Tazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 251 days.

(21) Appl. No.: 18/700,959

(22) PCT Filed: Sep. 9, 2022

(86) PCT No.: PCT/JP2022/033965
§ 371 (c)(1),
(2) Date: Apr. 12, 2024

(87) PCT Pub. No.: WO2023/074151
PCT Pub. Date: May 4, 2023

(65) Prior Publication Data

US 2024/0413776 A1 Dec. 12, 2024

(30) Foreign Application Priority Data

Oct. 28, 2021 (JP) ................................ 2021-176747

(51) Int. Cl.
*H02P 23/14* (2006.01)
*H02P 21/05* (2006.01)
(Continued)

(52) U.S. Cl.
CPC .............. *H02P 23/14* (2013.01); *H02P 21/05* (2013.01); *H02P 21/20* (2016.02); *H02P 23/30* (2016.02); *H02P 2207/05* (2013.01)

(58) Field of Classification Search
CPC ............ H02P 29/00; H02P 6/06; H02P 23/14; H02P 2205/07; H02P 23/0004;
(Continued)

(56) References Cited

U.S. PATENT DOCUMENTS 6,211,640 B1 * 4/2001 Fujisaki .................... H02P 6/17 318/636
2004/0245959 A1 12/2004 Komiya
(Continued)

FOREIGN PATENT DOCUMENTS

JP 05-203485 8/1993
JP 05-346813 12/1993
(Continued)

OTHER PUBLICATIONS

International Search Report of PCT application No. PCT/JP2022/033965 dated Oct. 11, 2022.

*Primary Examiner* — Antony M Paul
(74) *Attorney, Agent, or Firm* — GREENBLUM & BERNSTEIN, P.L.C.

(57) ABSTRACT

Frequency characteristics are measured with high accuracy. Frequency characteristic measurement apparatus includes first output part, frequency characteristic calculator, resonance frequency calculator, and second output part. Frequency characteristic calculator calculates a first frequency characteristic of servo system based on a first excitation signal in a first frequency range from first output part (11) and a first state signal acquired from servo system having received the first excitation signal. Resonance frequency calculator calculates a resonance frequency or an antiresonance frequency of servo system based on the first frequency
(Continued)

characteristic. Second output part outputs a second excitation signal in a second frequency range including the resonance frequency or the antiresonance frequency. Frequency characteristic calculator calculates a second frequency characteristic of servo system based on a second excitation signal and a second state signal acquired from servo system having received the second excitation signal.

8 Claims, 10 Drawing Sheets

(51) Int. Cl.
*H02P 21/20* (2016.01)
*H02P 23/30* (2016.01)

(58) Field of Classification Search
CPC .......... H02P 29/50; H02P 23/04; H02P 23/30; H02P 21/05; H02P 21/14; H02P 21/20; H02P 2207/05; H02P 5/46; G05B 19/05; G05B 2219/41122; G05B 2219/34048; G05B 2219/37434; G05B 19/19; G05B 19/402; G05B 19/414; G05B 19/404; G05B 19/416; G05B 2219/1185; G05D 3/12; G01H 1/003; G01H 1/14; G01H 1/16; G01H 1/10; G01R 23/02; G01R 31/2837; G01R 23/16; G01R 31/343; G06F 17/141
See application file for complete search history.

(56) References Cited

U.S. PATENT DOCUMENTS

| | | | |
|---|---|---|---|
| 2016/0123796 A1 | 5/2016 | Nagaoka et al. | |
| 2016/0246305 A1 | 8/2016 | Odai et al. | |
| 2017/0277206 A1* | 9/2017 | Iijima | G05D 17/02 |
| 2017/0292980 A1 | 10/2017 | Miyaji et al. | |
| 2020/0310485 A1 | 10/2020 | Luo et al. | |

FOREIGN PATENT DOCUMENTS

| | | |
|---|---|---|
| JP | 07-260851 | 10/1995 |
| JP | 08-094690 | 4/1996 |
| JP | 2000-278990 | 10/2000 |
| JP | 2005-050057 | 2/2005 |
| JP | 2006-166600 | 6/2006 |
| JP | 3877252 B | 2/2007 |
| JP | 2008-145374 | 6/2008 |
| JP | 4110358 B | 7/2008 |
| JP | 2009-092398 | 4/2009 |
| JP | 4259961 B | 4/2009 |
| JP | 4273560 B | 6/2009 |
| JP | 4325566 B | 9/2009 |
| JP | 4349275 B | 10/2009 |
| JP | 5240112 B | 7/2013 |
| JP | 5490335 B | 5/2014 |
| JP | 2015-158446 | 9/2015 |
| JP | 6127153 B | 5/2017 |
| JP | 6214480 B | 10/2017 |
| JP | 2019-091141 | 6/2019 |
| JP | 6697313 B | 5/2020 |
| JP | 2020-165795 | 10/2020 |

* cited by examiner

Torque Signal

Torque Signal

Torque Signal

Torque Signal

Torque Signal

FREQUENCY CHARACTERISTIC MEASUREMENT APPARATUS AND FREQUENCY CHARACTERISTIC MEASUREMENT METHOD

TECHNICAL FIELD

The present disclosure relates to a frequency characteristic measurement apparatus that measures frequency characteristics of a servo system.

BACKGROUND ART

Techniques for measuring frequency characteristics of servo systems have been conventionally known (e.g., refer to PTL 1).

CITATION LIST

Patent Literature

PTL 1: Unexamined Japanese Patent Publication No. 2019-91141

SUMMARY OF THE INVENTION

Frequency characteristics of servo systems are desired to be measured with high accuracy.

Thus, it is an object of the present disclosure to provide a frequency characteristic measurement apparatus and the like capable of obtaining frequency characteristics with high accuracy of a servo system.

A frequency characteristic measurement apparatus according to an aspect of the present disclosure includes a first output part, a frequency characteristic calculator, a resonance frequency calculator, and a second output part. The first output part outputs a first excitation signal in a first frequency range. The frequency characteristic calculator calculates a first frequency characteristic of the servo system in the first frequency range based on the first excitation signal and a first state signal that indicates a state quantity of the servo system and is acquired from the servo system having received the first excitation signal. The resonance frequency calculator calculates at least one of a resonance frequency and an antiresonance frequency of the servo system based on the first frequency characteristic. The second output part outputs a second excitation signal in a second frequency range including at least one of the resonance frequency and the antiresonance frequency calculated by the resonance frequency calculator and belonging to a partial range of the first frequency range. The frequency characteristic calculator further calculates a second frequency characteristic of the servo system in the second frequency range based on the second excitation signal and a second state signal indicating a state quantity of the servo system acquired from the servo system having received the second excitation signal.

A frequency characteristic measurement method according to another aspect of the present disclosure includes a first output step, a first frequency characteristic calculation step, a resonance frequency calculation step, a second output step, and a second frequency characteristic calculation step. The first output step is configured to output a first excitation signal in a first frequency range. The first frequency characteristic calculation step is configured to calculate a first frequency characteristic of the servo system in the first frequency range based on the first excitation signal and a first state signal that indicates a state quantity of the servo system and is acquired from the servo system having received the first excitation signal. The resonance frequency calculation step is configured to calculate at least one of a resonance frequency and an antiresonance frequency of the servo system based on the first frequency characteristic. The second output step is configured to output a second excitation signal in a second frequency range including at least one of the resonance frequency and the antiresonance frequency calculated in the resonance frequency calculation step and belonging to a partial range of the first frequency range. The second frequency characteristic calculation step is configured to calculate a second frequency characteristic of the servo system in the second frequency range based on the second excitation signal and a second state signal indicating a state quantity of the servo system acquired from the servo system having received the second excitation signal.

The frequency characteristic measurement apparatus or the frequency characteristic measurement method of the above aspect of the present disclosure enables obtaining frequency characteristics with high accuracy of a servo system.

DESCRIPTION OF EMBODIMENT

Figure 1:
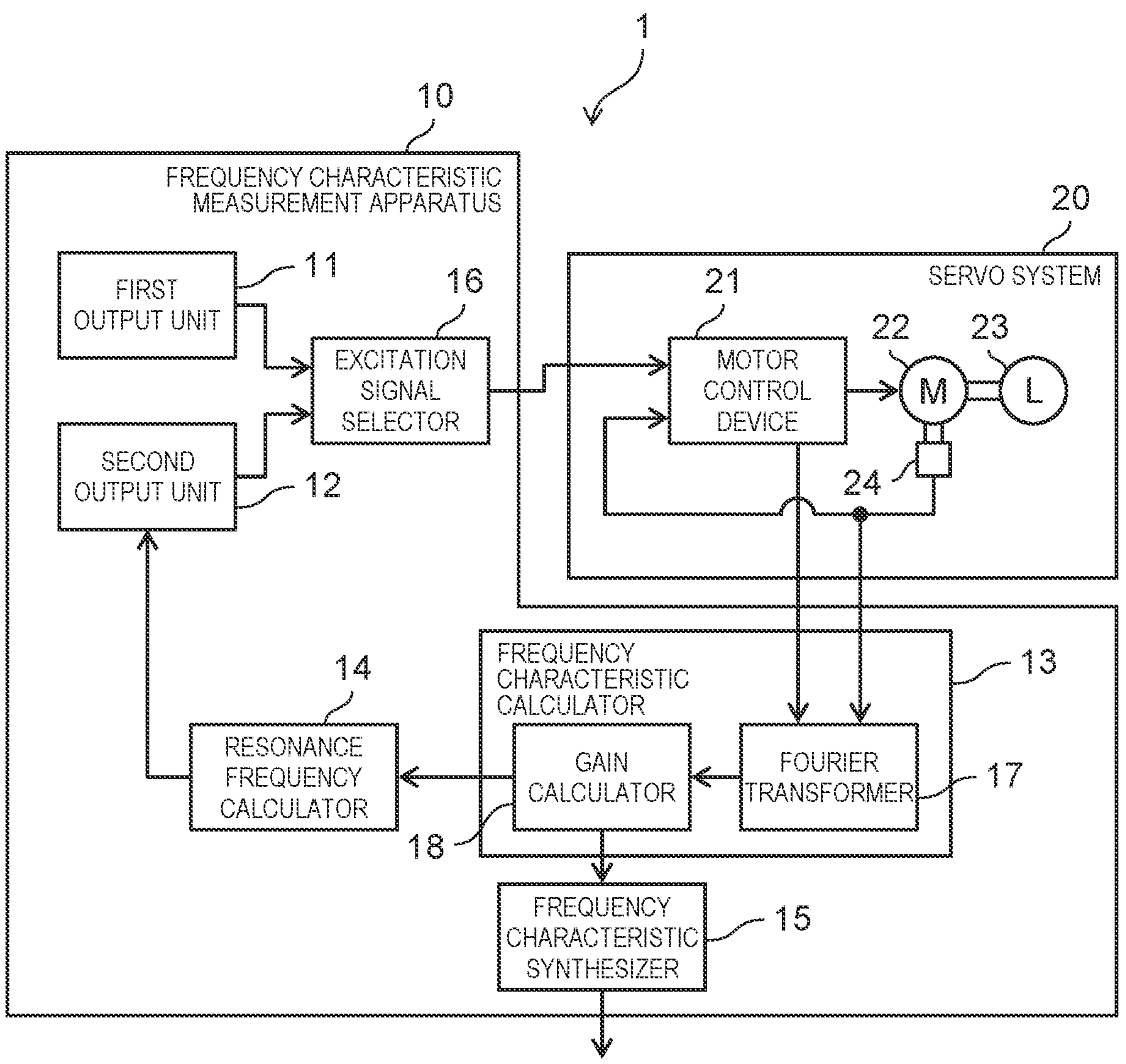
FIG. 1 is a block diagram illustrating a configuration of a frequency characteristic measurement system according to an exemplary embodiment.

Background to Obtain an Aspect of the Present Disclosure

When an excitation signal including a frequency component of a frequency band to be measured for frequency characteristics is input to a servo system to measure frequency characteristics of the servo system, the frequency component included in the excitation signal may be insufficient in a specific frequency band such as a resonance frequency band located in a low frequency region, an antiresonance frequency band located in a low frequency region, or an antiresonance frequency band having a large depth coefficient. Then, when a frequency band exists in which the frequency component included in the excitation signal is insufficient as described above, frequency characteristics with high accuracy of the servo system cannot be obtained.

Thus, the inventors have extensively conducted studies and experiments on a frequency characteristic measurement method capable of obtaining frequency characteristics with high accuracy of a servo system even when a resonance frequency or an antiresonance frequency of the servo system is included in a frequency band to be measured for frequency characteristics.

As a result, the inventors have obtained findings described below. First, an excitation signal including a frequency component in a frequency band to be measured for frequency characteristics is input to measure the frequency characteristics of the servo system, and then a resonance frequency or an antiresonance frequency of the servo system is calculated. Next, a specific frequency band including the resonance frequency or the antiresonance frequency is set to be measured, and then a new excitation signal including more frequency components of the specific frequency band is input to measure the frequency characteristics of the servo system. As a result, findings has been obtained in which the frequency characteristics with high accuracy of the servo system can be obtained based on the frequency characteristics measured first and the frequency characteristics measured next even when the resonance frequency or the antiresonance frequency of the servo system is included in the frequency band to be measured for the frequency characteristics.

Then, the inventors have further conducted studies and experiments based on the findings, and have conceived a frequency characteristic measurement apparatus according to the present disclosure described below.

A frequency characteristic measurement apparatus according to an aspect of the present disclosure includes a first output part, a frequency characteristic calculator, a resonance frequency calculator, and a second output part. The first output part outputs a first excitation signal in a first frequency range. The frequency characteristic calculator calculates a first frequency characteristic of the servo system in the first frequency range based on the first excitation signal and a first state signal that indicates a state quantity of the servo system and is acquired from the servo system having received the first excitation signal. The resonance frequency calculator calculates at least one of a resonance frequency and an antiresonance frequency of the servo system based on the first frequency characteristic. The second output part outputs a second excitation signal in a second frequency range including at least one of the resonance frequency and the antiresonance frequency calculated by the resonance frequency calculator and belonging to a partial range of the first frequency range. The frequency characteristic calculator further calculates a second frequency characteristic of the servo system in the second frequency range based on the second excitation signal and a second state signal indicating a state quantity of the servo system acquired from the servo system having received the second excitation signal.

The frequency characteristic measurement apparatus configured as described above is capable of outputting the second excitation signal in the second frequency range including the resonance frequency or the antiresonance frequency to the servo system, the second excitation signal being different from the first excitation signal, when the resonance frequency or the antiresonance frequency of the servo system is included in the first frequency range.

Thus, this configuration enables obtaining not only the first frequency characteristic calculated using the first excitation signal in the first frequency range, but also the second frequency characteristic calculated using the second excitation signal in the second frequency range.

As a result, even when the resonance frequency or the antiresonance frequency of the servo system is included in the first frequency range, the frequency characteristic measurement apparatus configured as described above is capable of obtaining frequency characteristics of the servo system more accurately than a conventional frequency characteristic measurement apparatus configured to be capable of obtaining only the first frequency characteristic.

As described above, the frequency characteristic measurement apparatus configured as described above is capable of obtaining frequency characteristics with high accuracy of the servo system.

Then, the first excitation signal may be any one of a white noise signal, a multiple sinusoidal signal, a sinusoidal sweep signal, a step signal, and a lamp signal.

The second excitation signal may be a multiple sinusoidal signal or a sinusoidal sweep signal.

The frequency characteristic measurement apparatus may further include a frequency characteristic synthesizer that synthesizes the first frequency characteristic and the second frequency characteristic to calculate a third frequency characteristic of the servo system in the first frequency range.

The frequency characteristic calculator may also calculate the second frequency characteristic with a frequency resolution finer than a frequency resolution at the time of calculating the first frequency characteristic.

The second output part may calculate an amplitude of the second excitation signal to be output, based on the first frequency characteristic.

The first output part may output the first excitation signal multiple times, and the frequency characteristic calculator may calculate the first frequency characteristic based on the first excitation signal and a plurality of the first state signals acquired from the servo system for each of the first excitation signals output from the first output part multiple times.

The first state signal and the second state signal may include sensor information indicating a state quantity of a driven body obtained by sensing the driven body in the servo system.

A frequency characteristic measurement method according to another aspect of the present disclosure includes a first output step, a first frequency characteristic calculation step, a resonance frequency calculation step, a second output step, and a second frequency characteristic calculation step. The first output step is configured to output a first excitation signal in a first frequency range. The first frequency characteristic calculation step is configured to calculate a first frequency characteristic of the servo system in the first frequency range based on the first excitation signal and a first state signal that indicates a state quantity of the servo system and is acquired from the servo system having received the first excitation signal. The resonance frequency calculation step is configured to calculate at least one of a resonance frequency and an antiresonance frequency of the servo system based on the first frequency characteristic. The second output step is configured to output a second excitation signal in a second frequency range including at least one of the resonance frequency and the antiresonance frequency calculated in the resonance frequency calculation step and belonging to a partial range of the first frequency range. The second frequency characteristic calculation step is configured to calculate a second frequency characteristic of the servo system in the second frequency range based on the second excitation signal and a second state signal indicating a state quantity of the servo system acquired from the servo system having received the second excitation signal.

The frequency characteristic measurement method described above enables outputting the second excitation signal in the second frequency range including the resonance frequency or the antiresonance frequency to the servo system, the second excitation signal being different from the first excitation signal, when the resonance frequency or the antiresonance frequency of the servo system is included in the first frequency range.

Thus, this configuration enables obtaining not only the first frequency characteristic calculated using the first excitation signal in the first frequency range, but also the second frequency characteristic calculated using the second excitation signal in the second frequency range.

As a result, even when the resonance frequency or the antiresonance frequency of the servo system is included in the first frequency range, the frequency characteristic measurement method described above enables obtaining frequency characteristics of the servo system more accurately than a conventional frequency characteristic measurement method that enables obtaining only the first frequency characteristic.

As described above, the frequency characteristic measurement method described above enables obtaining frequency characteristics with high accuracy of the servo system.

Hereinafter, a specific example of a frequency characteristic measurement apparatus according to an aspect of the present disclosure will be described with reference to the drawings. Exemplary embodiments to be described herein each illustrate a specific example of the present disclosure. Numerical values, shapes, constituent components, arrangement positions and connection modes of the constituent components, steps, order of the steps, and the like illustrated in the following exemplary embodiments are merely examples, and thus are not intended to limit the present disclosure. Each of the drawings is a schematic view, and is not necessarily illustrated precisely. Each of the drawings indicates a component, which is substantially identical to that in another drawing, with an identical reference sign, and duplicated description thereof will not be described or will be simplified.

Exemplary Embodiment

Hereinafter, a frequency characteristic measurement system according to an exemplary embodiment will be described. This frequency characteristic system is configured to measure frequency characteristics of a servo system.

Configuration

FIG. 1 is a block diagram illustrating a configuration of frequency characteristic measurement system 1 according to an exemplary embodiment.

As illustrated in FIG. 1, frequency characteristic measurement system 1 includes frequency characteristic measurement apparatus 10 and servo system 20.

Servo system 20 is to be measured for frequency characteristics by frequency characteristic measurement apparatus 10, and includes motor control device 21, motor 22, load 23, and first state quantity measurement device 24.

Motor 22 is controlled by motor control device 21 to drive load 23. Here, motor 22 will be described as a rotary motor. However, motor 22 is not necessarily limited to the rotary motor, and may be a linear motor, for example.

Load 23 is a driven body in servo system 20 and is driven by motor 22.

First state quantity measurement device 24 measures a state quantity of servo system 20 from servo system 20, and outputs a state signal indicating the measured state quantity of servo system 20. First state quantity measurement device 24 is here described as that of outputting a state quantity related to motor 22 as the state signal. More specifically, first state quantity measurement device 24 will be described as an encoder that measures a rotational position of motor 22 and outputs the state signal indicating the rotational position of motor 22. However, first state quantity measurement device 24 is not necessarily limited to the encoder as long as it is a device capable of measuring a state quantity of servo system 20 and outputting a state signal indicating the measured state quantity of servo system 20.

Motor control device 21 performs control to cause a state quantity of the motor to be equal to a state quantity command received. Motor 22 in the present exemplary embodiment is controlled based on an excitation signal (a first excitation signal to be described later and a second excitation signal to be described later) output from frequency characteristic measurement apparatus 10. The excitation signal output from frequency characteristic measurement apparatus 10 is here a torque command (referred to below also as an "input torque command") that commands torque of motor 22. Motor control device 21 will be described as of outputting a feedback torque command to motor 22 using the first state signal output from first state quantity measurement device 24 when receiving the input torque command output from frequency characteristic measurement apparatus 10, the feedback torque command causing torque generated by the motor to be equal to the input torque command. However, motor control device 21 is not necessarily limited to the above configuration as long as motor 22 can be controlled based on an excitation signal output from frequency characteristic measurement apparatus 10, and may be configured to directly output the excitation signal output from frequency characteristic measurement apparatus 10 to motor 22 without performing feedback control on the excitation signal, for example.

Motor control device 21 also outputs an excitation signal for frequency characteristic measurement based on the excitation signal output from frequency characteristic measurement apparatus 10 to frequency characteristic measurement apparatus 10.

The excitation signal for frequency characteristic measurement output from motor control device 21 is here described as an input torque command. However, the excitation signal for frequency characteristic measurement is not necessarily limited to the configuration of the input torque command as long as the signal is based on the excitation signal output from the frequency characteristic measurement apparatus 10. The excitation signal for frequency characteristic measurement may be an input speed command that commands speed of motor 22 or an input position command that commands a position of motor 22, for example.

Frequency characteristic measurement apparatus 10 includes first output part 11, second output part 12, frequency characteristic calculator 13, resonance frequency calculator 14, frequency characteristic synthesizer 15, and excitation signal selector 16, to measure frequency characteristics of servo system 20.

Frequency characteristic measurement apparatus 10 may be implemented in a computer device including a processor, a memory, and an input and output interface by executing a program stored in the memory using the processor, for example.

First output part 11 outputs a first excitation signal in the first frequency range. The first frequency range is here described as a frequency range of frequency characteristics measured by frequency characteristic measurement apparatus 10. As described above, the first excitation signal is here described as a torque command (first torque command) that commands torque of motor 22.

The first excitation signal output from first output part 11 is any one of a white noise signal, a multiple sinusoidal signal, a sinusoidal sweep signal, a step signal, and a lamp signal.

Figure 2A:
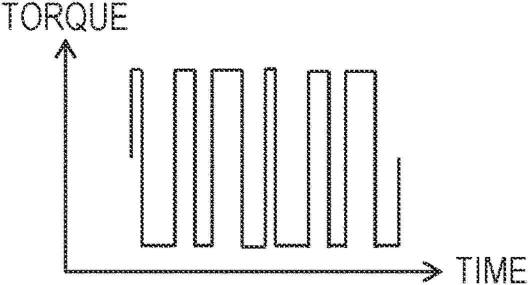
FIG. 2A is a waveform diagram illustrating an example of a white noise signal.
Figure 2B:
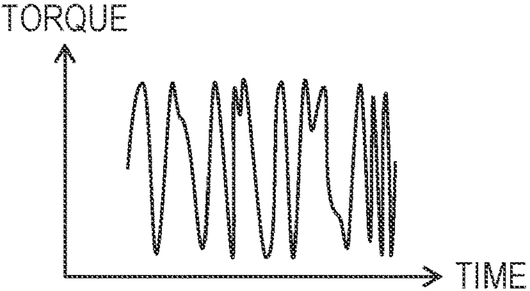
FIG. 2B is a waveform diagram illustrating an example of a multiple sinusoidal signal.
Figure 2C:
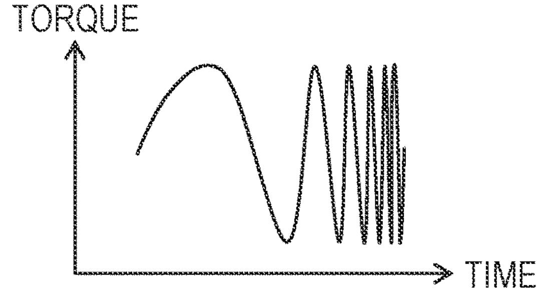
FIG. 2C is a waveform diagram illustrating an example of a sinusoidal sweep signal.
Figure 2D:
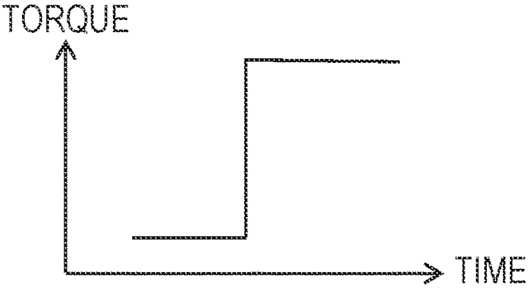
FIG. 2D is a waveform diagram illustrating an example of a step signal.
Figure 2E:
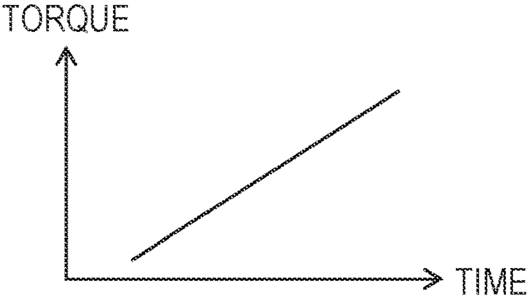
FIG. 2E is a waveform diagram illustrating an example of a lamp signal.

FIG. 2A is a waveform diagram illustrating an example of the white noise signal, FIG. 2B is a waveform diagram illustrating an example of the multiple sinusoidal signal, FIG. 2C is a waveform diagram illustrating an example of the sinusoidal sweep signal, FIG. 2D is a waveform diagram illustrating an example of the step signal, and FIG. 2E is a waveform diagram illustrating an example of the lamp signal.

FIGS. 2A to 2E each have a horizontal axis representing time, and a vertical axis representing torque.

The white noise signal exemplified in FIG. 2A has a feature in which the signal is easily generated while being affected by noise in a high frequency band.

The multiple sinusoidal signal exemplified in FIG. 2B has a feature in which strong signal intensity can be obtained while a frequency range needs to be set for the signal.

The sinusoidal sweep signal exemplified in FIG. 2C has a feature in which strong signal intensity can be obtained while a frequency range needs to be set for the signal.

The step signal exemplified in FIG. 2D has a feature in which the signal is easily generated while having weak signal intensity in a high frequency band.

The lamp signal exemplified in FIG. 2E has a feature in which the signal is easily generated while having weak signal intensity in a high frequency band.

The first excitation signal output by first output part 11 is here described as the white noise signal.

Returning to FIG. 1 again, frequency characteristic measurement system 1 will be described continuously.

Excitation signal selector 16 selects any one of the first excitation signal output from first output part 11 and a second excitation signal (described later) output from second output part 12, and outputs the selected first excitation signal or second excitation signal to servo system 20 as an excitation signal.

Frequency characteristic calculator 13 calculates frequency characteristics of servo system 20 based on the excitation signal input to servo system 20 and a state signal acquired from servo system 20 having received the excitation signal.

That is, (1) when the first excitation signal in the first frequency range output from frequency characteristic measurement apparatus 10 is input to servo system 20, frequency characteristic calculator 13 calculates the first frequency characteristic of servo system 20 in the first frequency range based on the first excitation signal and the first state signal acquired from servo system 20 having received the first excitation signal. Then, (2) when the second excitation signal in the second frequency range output from frequency characteristic measurement apparatus 10 is input to servo system 20, frequency characteristic calculator 13 calculates the second frequency characteristic of servo system 20 in the second frequency range based on the second excitation signal and the second state signal acquired from servo system 20 having received the second excitation signal.

More specifically, (1) when the first excitation signal is input to servo system 20, frequency characteristic calculator 13 calculates the first frequency characteristic of servo system 20 in the first frequency range based on a first input torque command output from motor control device 21 in servo system 20 having received the first excitation signal and the first state signal output from first state quantity measurement device 24 in servo system 20 having received the first excitation signal. Then, (2) when the second excitation signal is input to servo system 20, frequency characteristic calculator 13 calculates the second frequency characteristic of servo system 20 in the second frequency range based on a second input torque command output from motor control device 21 in servo system 20 having received the second excitation signal and the second state signal output from first state quantity measurement device 24 in servo system 20 having received the second excitation signal.

The frequency characteristics calculated by frequency characteristic calculator 13 is here described as frequency characteristics of rotational speed [rpm] of motor 22 on input torque [Nm] input to servo system 20.

Figure 3:
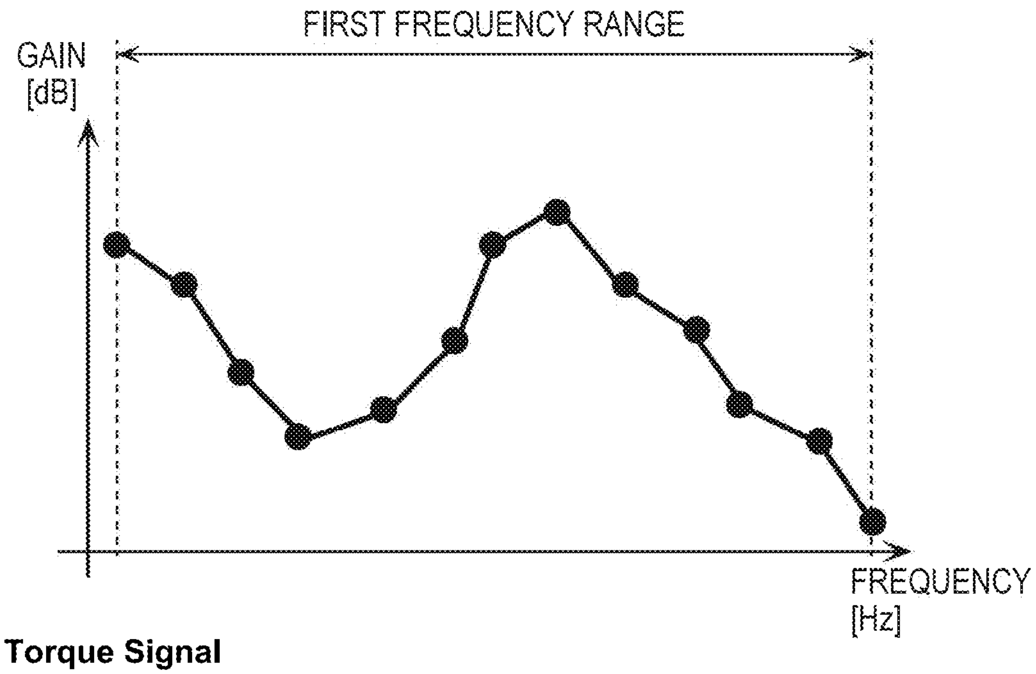
FIG. 3 is a Bode diagram illustrating an example of a first frequency characteristic calculated by a frequency characteristic calculator of a frequency characteristic measurement apparatus according to an exemplary embodiment.

FIG. 3 is a Bode diagram illustrating an example of the first frequency characteristic calculated by frequency characteristic calculator 13 when frequency characteristic measurement apparatus 10 outputs the first excitation signal.

FIG. 3 has a horizontal axis representing frequency, and a vertical axis representing gain G expressed by Expression (1).

[Expression 1]

$$G[\text{dB}] = 20\log_{10}\left(\frac{\text{INPUT TORQUE } [Nm]}{\text{ROTATIONAL SPEED } [rpm]}\right) \quad (1)$$

Returning to FIG. 1 again, frequency characteristic measurement system 1 will be described continuously.

As illustrated in FIG. 1, frequency characteristic calculator 13 may be implemented by a configuration including Fourier transformer 17 and gain calculator 18, for example. Here, Fourier transformer 17 performs the Fourier transform on an input torque command output from motor control device 21 and rotational speed of motor 22 obtained by time-differentiating a state signal indicating a rotational position of motor 22 output from first state quantity measurement device 24. Then, gain calculator 18 calculates a gain for each rotational speed by substituting input torque for each frequency component and rotational speed for each frequency component, which are subjected to the Fourier transform by Fourier transformer 17, into Expression (1).

When frequency characteristic measurement apparatus 10 outputs a first excitation signal and frequency characteristic calculator 13 calculates a first frequency characteristic, resonance frequency calculator 14 calculates at least one of a resonance frequency and an antiresonance frequency of servo system 20 based on the first frequency characteristic.

Figure 4:
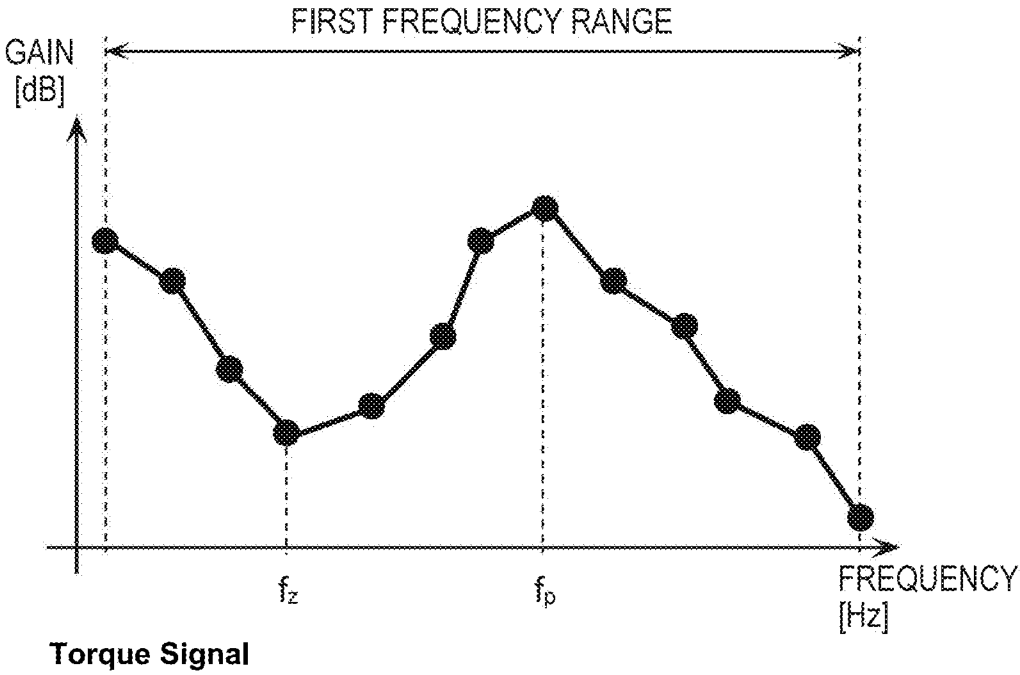
FIG. 4 is a Bode diagram illustrating an example of a state in which a resonance frequency calculator of a frequency characteristic measurement apparatus according to an exemplary embodiment calculates a resonance frequency and an antiresonance frequency.

FIG. 4 is a Bode diagram illustrating an example of a state in which resonance frequency calculator 14 calculates resonance frequency $f_p$ and antiresonance frequency $f_z$ of servo system 20 based on the first frequency characteristic.

FIG. 4 has a horizontal axis representing frequency, and a vertical axis representing gain G expressed by Expression (1).

As illustrated in FIG. 4, when there is a point at which a variation of gain for increase in frequency turns from increase to decrease in the first frequency range, or when there is a point at which the variation of gain for the increase in frequency has a convex tip, resonance frequency calculator 14 calculates a frequency at the point as the resonance frequency. Then, when there is a point at which the variation of gain for increase in frequency turns from decrease to increase in the first frequency range, or when there is a point at which the variation of gain for the increase in frequency has a concave bottom, resonance frequency calculator 14 calculates a frequency at the point as the antiresonance frequency.

Returning to FIG. 1 again, frequency characteristic measurement system 1 will be described continuously.

Second output part 12 outputs a second excitation signal in a second frequency range including at least one of the resonance frequency and the antiresonance frequency calculated by resonance frequency calculator 14 and belonging to a partial range of the first frequency range.

The second excitation signal is for measuring frequency characteristics near the resonance frequency or the antiresonance frequency again with higher accuracy in servo system 20.

The second excitation signal output from second output part 12 is a multiple sinusoidal signal or a sinusoidal sweep signal.

The second excitation signal output by second output part 12 is here described as the multiple sinusoidal signal.

Second output part 12 calculates a second frequency range of a second excitation signal to be output based on the resonance frequency or the antiresonance frequency calculated by resonance frequency calculator 14.

Figure 5:
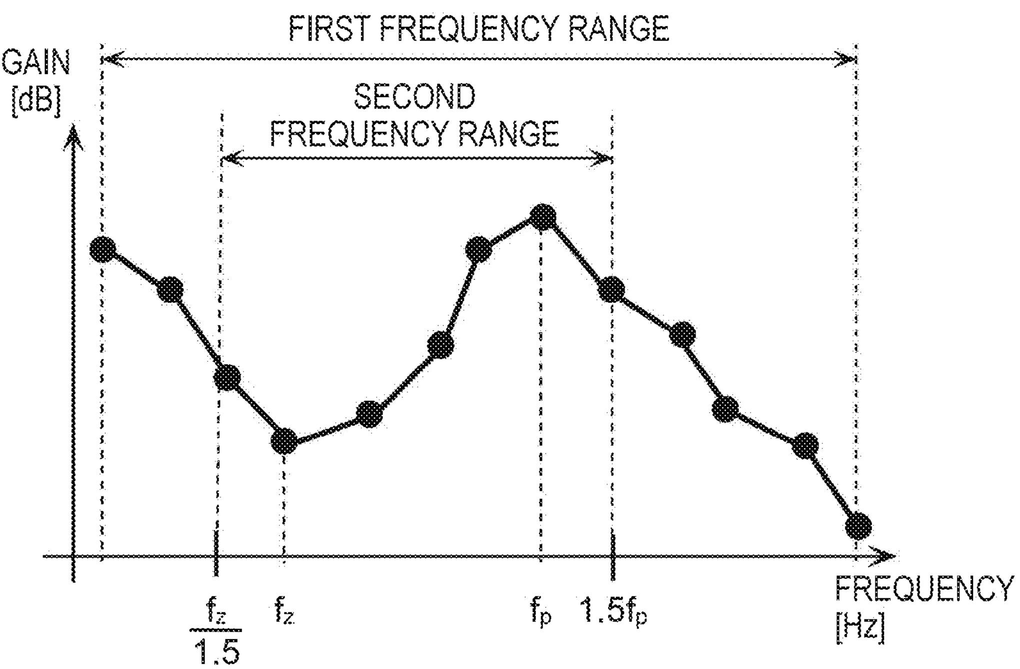
FIG. 5 is a Bode diagram illustrating an example of a state in which a resonance frequency calculator of a frequency characteristic measurement apparatus according to an exemplary embodiment calculates a second frequency range.

FIG. 5 is a Bode diagram illustrating an example of a state in which second output part 12 calculates the second frequency range when resonance frequency $f_p$ and antiresonance frequency $f_z$ are calculated by resonance frequency calculator 14.

FIG. 5 has a horizontal axis representing frequency, and a vertical axis representing gain G expressed by Expression (1).

As illustrated in FIG. 5, when resonance frequency $f_p$ and antiresonance frequency $f_z$ are calculated by resonance frequency calculator 14, second output part 12 may calculate the second frequency range in which the larger one of $f_z/1.5$ and a lower limit frequency of the first frequency range is set as a lower limit frequency and the smaller one of "$f_p\times1.5$" and an upper limit frequency of the first frequency range is set as an upper limit frequency, for example.

Then, when only resonance frequency $f_p$ is calculated by resonance frequency calculator 14, second output part 12 may calculate the second frequency range in which the larger one of $f_p/1.5$ and the lower limit frequency of the first frequency range is set as the lower limit frequency and the smaller one of "$f_p\times1.5$" and the upper limit frequency of the first frequency range is set as the upper limit frequency, for example.

Additionally, when only antiresonance frequency $f_z$ is calculated by resonance frequency calculator 14, second output part 12 may calculate the second frequency range in which the larger one of $f_z/1.5$ and the lower limit frequency of the first frequency range is set as the lower limit frequency and the smaller one of "$f_z\times1.5$" and the upper limit frequency of the first frequency range is set as the upper limit frequency, for example.

Returning to FIG. 1 again, frequency characteristic measurement system 1 will be described continuously.

Second output part 12 calculates an amplitude of a second excitation signal to be output based on the first frequency characteristic calculated by frequency characteristic calculator 13. More specifically, second output part 12 calculates the amplitude of the second excitation signal to be output based on a gain at the resonance frequency or the antiresonance frequency calculated by resonance frequency calculator 14.

Figure 6A:
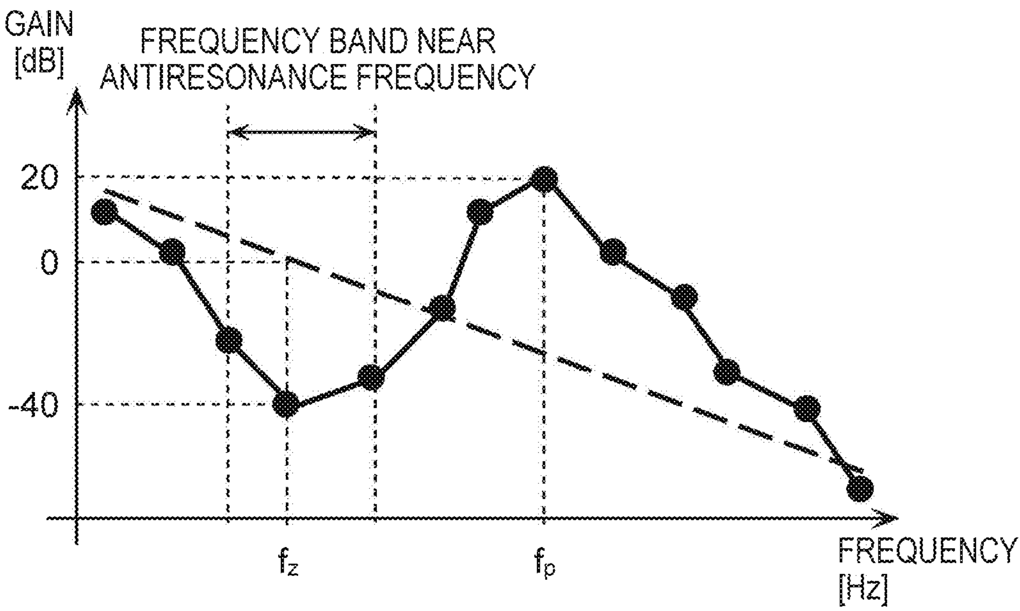
FIG. 6A is a Bode diagram illustrating an example of a state in which a second output part of a frequency characteristic measurement apparatus according to an exemplary embodiment calculates an amplitude of a second excitation signal.
Figure 6B:
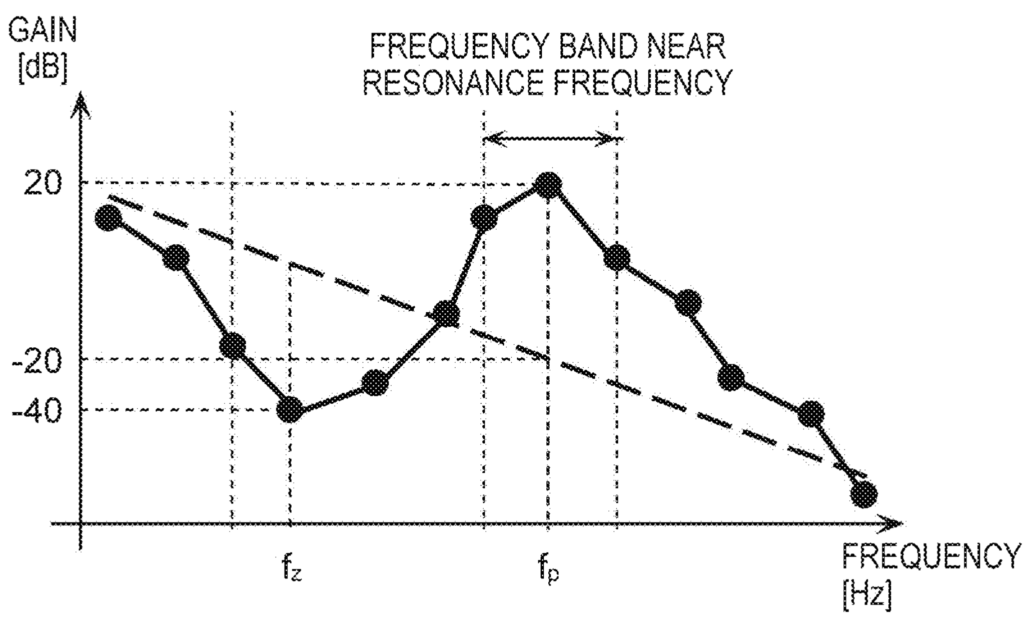
FIG. 6B is a Bode diagram illustrating an example of a state in which a second output part of a frequency characteristic measurement apparatus according to an exemplary embodiment calculates an amplitude of a second excitation signal.

FIGS. 6A and 6B are each a Bode diagram illustrating an example of a state in which second output part 12 calculates the amplitude of the second excitation signal when resonance frequency $f_p$ and antiresonance frequency $f_z$ are calculated by resonance frequency calculator 14.

FIGS. 6A and 6B each have a horizontal axis representing frequency, and a vertical axis representing gain G expressed by Expression (1), and each illustrate a broken line representing a frequency characteristic calculated when total inertia of movable parts of motor 22 and load 23 is approximated as that of a rigid body.

FIG. 6A is a Bode diagram illustrating an example of a state in which second output part 12 calculates the amplitude of the second excitation signal when a gain of antiresonance frequency $f_z$ calculated by resonance frequency calculator 14 decreases by 40 [db] from a gain calculated using rigid body approximation, which calculates the gain by assuming that the servo system is a rigid body. FIG. 6B is a Bode diagram illustrating an example of a state in which second output part 12 calculates the amplitude of the second excitation signal when a gain of resonance frequency $f_p$ calculated by resonance frequency calculator 14 increases by 40 [db] from the gain calculated using the rigid body approximation.

As illustrated in FIG. 6A, when the gain of antiresonance frequency $f_z$ decreases by 40 [db] from the gain calculated using the rigid body approximation, a ratio of an amplitude of an output signal (rotational speed) to that of an input signal (input torque) is 1/100 times that when the gain is calculated using the rigid body approximation.

In general, when an output signal extremely decreases in amplitude in measurement of frequency characteristics, the measurement deteriorates in accuracy.

Thus, second output part 12 causes the second excitation signal for measuring frequency characteristics of servo system 20 again to have an amplitude of an input signal (motor torque) near the antiresonance frequency, the amplitude being 100 times larger than that in FIG. 6A. As a result, a level of an output signal (rotational speed) near the antiresonance frequency increases to a level similar to that when the gain is calculated using the rigid body approximation, and thus remeasurement of the frequency characteristics using the second excitation signal can be accurately performed.

As illustrated in FIG. 6B, when the gain of resonance frequency $f_p$ increases by 40 [db] from the gain calculated using the rigid body approximation, a ratio of an amplitude of an output signal (rotational speed) to that of an input signal (input torque) is 100 times that when the gain is calculated using the rigid body approximation.

When rotational speed extremely increases, a device may be broken.

Thus, second output part 12 causes the second excitation signal for measuring frequency characteristics of servo system 20 again to have an amplitude of an input signal (motor torque) near the resonance frequency, the amplitude being 1/100 times that in FIG. 6B. As a result, a level of an output signal (rotational speed) near the resonance frequency decreases to a level similar to that when the gain is calculated using the rigid body approximation, and thus a device can be prevented from being broken in remeasurement of the frequency characteristics using the second excitation signal.

Returning to FIG. 1 again, frequency characteristic measurement system 1 will be described continuously.

As described above, when the second excitation signal is input to servo system 20, frequency characteristic calculator 13 calculates the second frequency characteristic.

Figure 7:
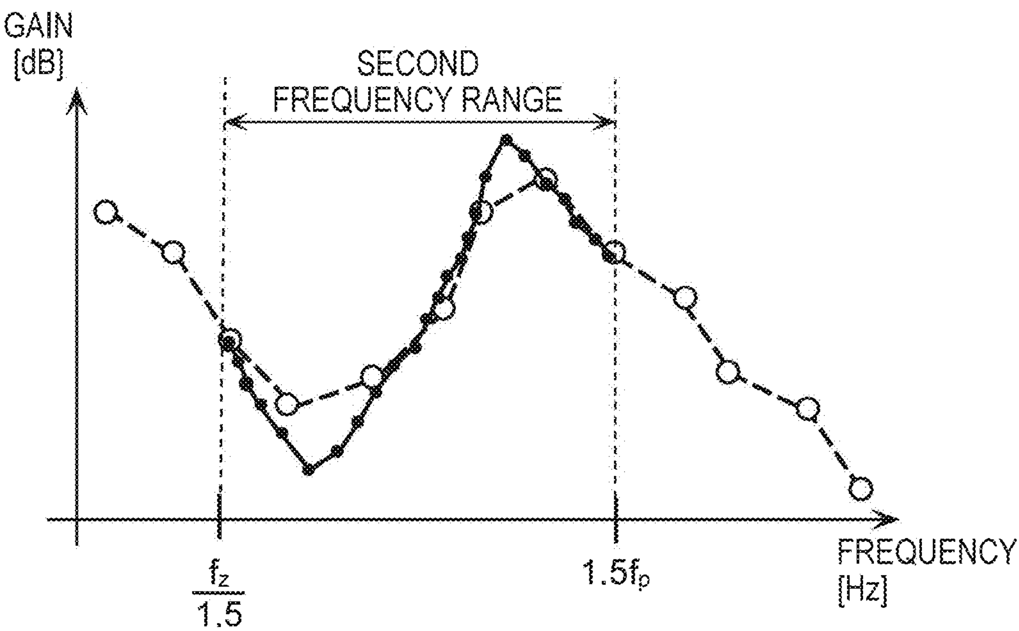
FIG. 7 is a Bode diagram illustrating an example of a second frequency characteristic calculated by a frequency characteristic calculator of a frequency characteristic measurement apparatus according to an exemplary embodiment.

FIG. 7 is a Bode diagram illustrating an example of the second frequency characteristic calculated by frequency characteristic calculator 13 when frequency characteristic measurement apparatus 10 outputs the second excitation signal.

FIG. 7 has a horizontal axis representing frequency, and a vertical axis representing gain G expressed by Expression (1), and illustrates a broken line representing the first frequency characteristic calculated by frequency characteristic calculator 13 when frequency characteristic measurement apparatus 10 outputs the first excitation signal.

As illustrated in FIG. 7, frequency characteristic calculator 13 calculates the second frequency characteristic with a frequency resolution finer than a frequency resolution at the time of calculating the first frequency characteristic.

Hereinafter, a specific example of a frequency resolution when frequency characteristic calculator 13 calculates the first frequency characteristic and the second frequency characteristic will be described. This example has the number of pieces of time-series input and output data at the time of measuring frequency characteristics, the number being fixed at 4096.

When calculating the first frequency characteristic, frequency characteristic calculator 13 calculates it with a sampling period of 1/16000 [s] (=62.5 [μs]). That is, the first frequency characteristic is calculated at a sampling frequency of 16000 [Hz].

As a result, the frequency characteristic data after the Fourier transform includes 4096 pieces of data uniformly in a frequency range up to 16000 [Hz].

Thus, frequency characteristic calculator 13 calculates the first frequency characteristic with a frequency resolution of 16000/4096 that is nearly equal to 3.91 [Hz]. That is, gains are plotted on the Bode diagram at intervals of 3.91 [Hz].

When calculating the second frequency characteristic, frequency characteristic calculator 13 calculates it with a sampling period of 1/2000 [s] (=500 [μs]). That is, the second frequency characteristic is calculated at a sampling frequency of 2000 [Hz].

As a result, the frequency characteristic data after the Fourier transform includes 4096 pieces of data uniformly in a frequency range up to 2000 [Hz].

Thus, frequency characteristic calculator 13 calculates the second frequency characteristic with a frequency resolution of 2000/4096 that is nearly equal to 0.488 [Hz]. That is, gains are plotted on the Bode diagram at intervals of 0.488 [Hz].

Returning to FIG. 1 again, frequency characteristic measurement system 1 will be described continuously.

Frequency characteristic synthesizer 15 synthesizes the first frequency characteristic and the second frequency characteristic calculated by frequency characteristic calculator 13 to calculate a third frequency characteristic of servo system 20 in the first frequency range, and outputs the calculated third frequency characteristic to the outside.

Figure 8:
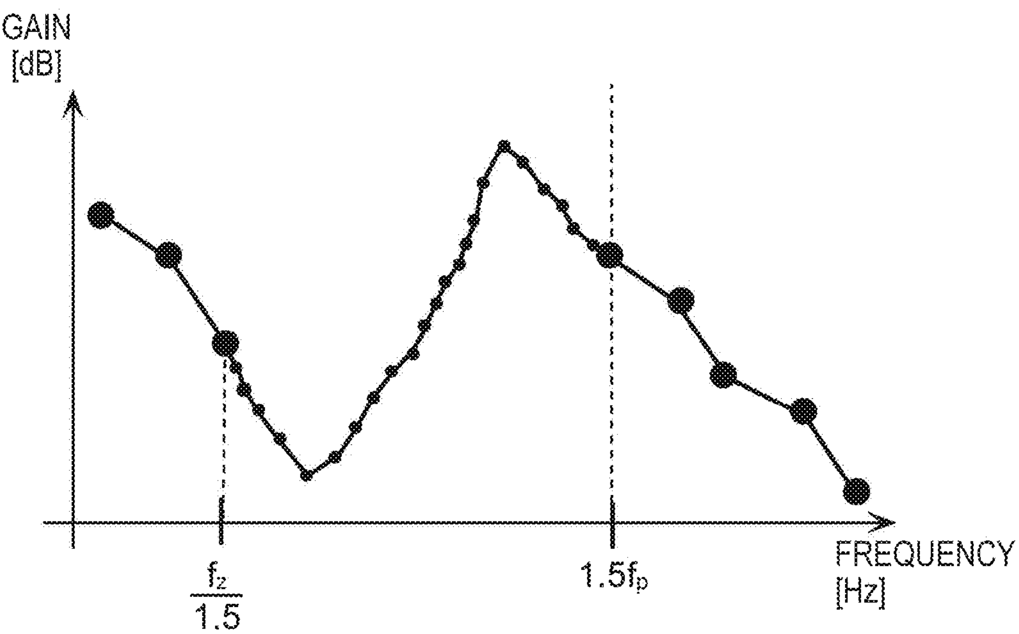
FIG. 8 is a Bode diagram illustrating an example of a state in which a frequency characteristic synthesizer of the frequency characteristic measurement apparatus according to an exemplary embodiment synthesizes a third frequency characteristic.

FIG. 8 is a Bode diagram illustrating an example of a state in which frequency characteristic synthesizer 15 synthesizes the first frequency characteristic and the second frequency characteristic to calculate the third frequency characteristic.

As illustrated in FIG. 8, frequency characteristic synthesizer 15 calculates the third frequency characteristic by replacing a frequency characteristic in the second frequency range in the first frequency characteristic with the second frequency characteristic, for example.

However, frequency characteristic synthesizer 15 is not necessarily limited to the configuration in which the third frequency characteristic is calculated by replacing the frequency characteristic in the second frequency range of the first frequency characteristic with the second frequency characteristic, as long as the third frequency characteristic can be calculated by synthesizing the first frequency characteristic and the second frequency characteristic. For example, frequency characteristic synthesizer 15 may be configured to calculate the third frequency characteristic using weighted average of the first frequency characteristic and the second frequency characteristic.

Operation

Hereinafter, operation performed by frequency characteristic measurement apparatus 10 having the above configuration will be described.

Frequency characteristic measurement apparatus 10 performs frequency characteristic measurement processing of measuring frequency characteristics of servo system 20. For example, the frequency characteristic measurement processing is started when a user using frequency characteristic measurement system 1 performs an operation to start the frequency characteristic measurement processing on the frequency characteristic measurement apparatus 10.

Figure 9:
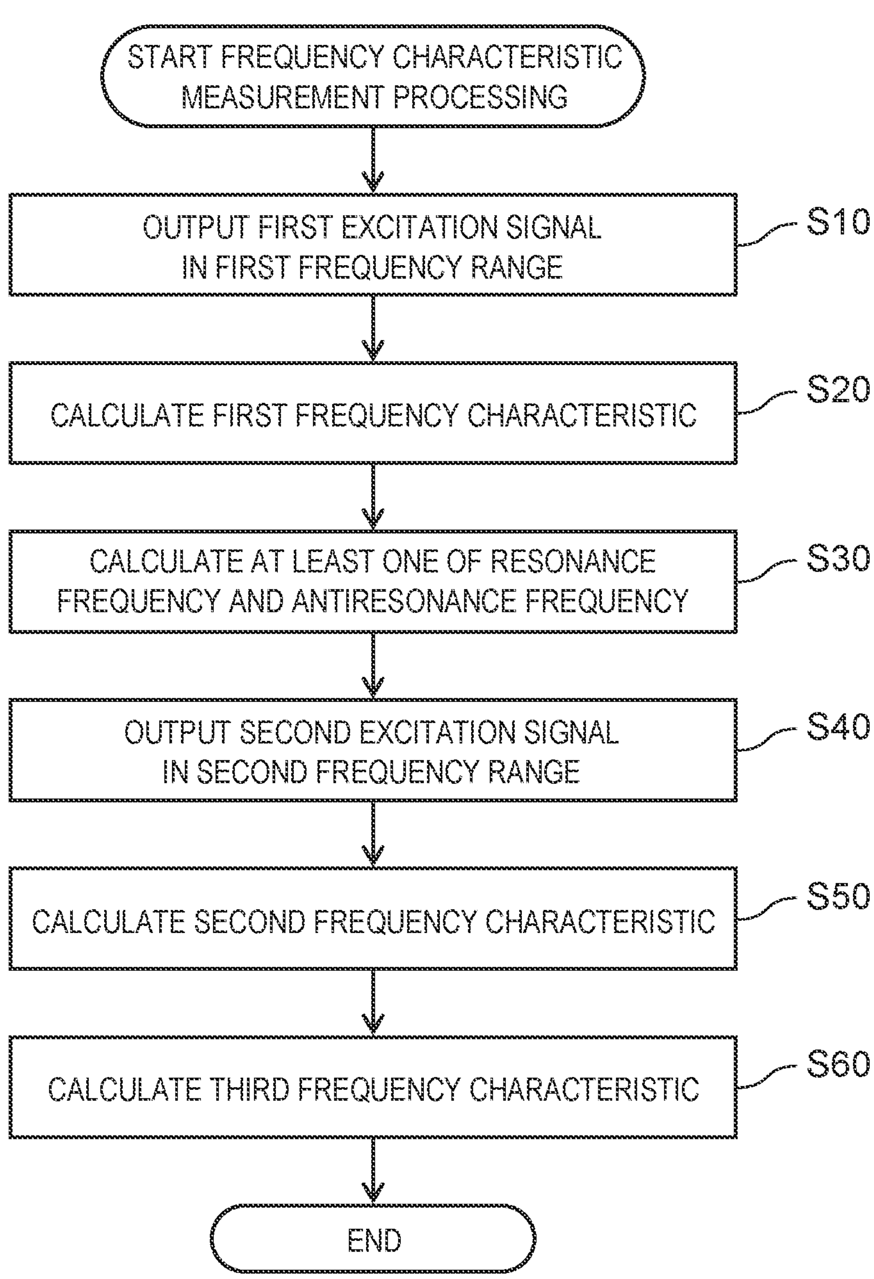
FIG. 9 is a flowchart of frequency characteristic measurement processing according to an exemplary embodiment.

FIG. 9 is a flowchart of the frequency characteristic measurement processing performed by frequency characteristic measurement apparatus 10.

As illustrated in FIG. 9, when the frequency characteristic measurement processing is started, first output part 11 outputs a first excitation signal in the first frequency range (step S10). Then, the first excitation signal is input to servo system 20. As a result, the first excitation signal output as an excitation signal for frequency characteristic measurement from servo system 20 and a first state signal are input to frequency characteristic calculator 13.

When receiving the first excitation signal and the first state signal, the frequency characteristic calculator 13 calculates a first frequency characteristic based on the first excitation signal and the first state signal (step S20).

When the first frequency characteristic is calculated, resonance frequency calculator 14 calculates at least one of a resonance frequency and an antiresonance frequency of servo system 20 based on the first frequency characteristic (step S30).

When at least one of the resonance frequency and the antiresonance frequency is calculated, second output part 12 generates a second excitation signal based on the resonance frequency or the antiresonance frequency, and outputs the generated second excitation signal (step S40). Then, the second excitation signal is input to servo system 20. As a result, the second excitation signal output from servo system 20 as an excitation signal for frequency characteristic measurement and a second state signal are input to frequency characteristic calculator 13.

When receiving the second excitation signal and the second state signal, the frequency characteristic calculator 13 calculates a second frequency characteristic based on the second excitation signal and the second state signal (step S50).

When the second frequency characteristic is calculated, frequency characteristic synthesizer 15 synthesizes the first frequency characteristic and the second frequency characteristic to calculate a third frequency characteristic of servo system 20 in the first frequency range (step S60), and outputs the calculated third frequency characteristic to the outside.

When processing in step S60 ends, frequency characteristic measurement apparatus 10 ends the frequency characteristic measurement processing.

Consideration

Frequency characteristic measurement apparatus 10 having the above configuration first measures the first frequency characteristic of servo system 20 using the first excitation signal in the first frequency range as a measurement target of frequency characteristics, and calculates the resonance frequency or the antiresonance frequency of servo system 20. Frequency characteristic measurement apparatus 10 next uses the second excitation signal in the second frequency range including the resonance frequency or the antiresonance frequency to measure the second frequency characteristic of servo system 20 with higher accuracy in the second frequency range. Frequency characteristic measurement apparatus 10 then synthesizes the measured first frequency characteristic and second frequency characteristic to output the third frequency characteristic in the first frequency range.

As a result, frequency characteristic measurement apparatus 10 having the above configuration enables obtaining frequency characteristics of servo system 20 with high accuracy even in frequency characteristics of servo system 20, the frequency characteristics including a resonance frequency band located in a low frequency region, an antiresonance frequency band located in a low frequency region, or an anti-resonance frequency band having a large depth coefficient, which coefficient represents a value of a depth of the anti-resonance frequency band.

Although an example is described in the present embodiment in which the first or second excitation signal is used as input information for calculating frequency characteristics, the excitation signal for frequency characteristic measurement and the first or second excitation signal do not necessarily need to coincide with each other. For example, when the first or second excitation signal is an input speed command, a feedback torque command may be used as the excitation signal for frequency characteristic measurement. Adopting such a configuration enables obtaining frequency characteristics without including influence of control of speed of a motor for torque of the motor of a servo system while controlling a speed state of the motor when the first or second excitation signal is applied.

Modification 1

Hereinafter, a frequency characteristic measurement system according to Modification 1 configured by partially changing the configuration of frequency characteristic measurement system 1 according to an exemplary embodiment will be described.

Frequency characteristic measurement system 1 is an example of a configuration for measuring frequency characteristics related to a state quantity of motor 22 in servo system 20. In contrast, a frequency characteristic measurement system according to Modification 1 is an example of a configuration for measuring frequency characteristics related to a state quantity of load 23 that is a driven body of servo system 20A (described later).

Hereinafter, the frequency characteristic measurement system according to Modification 1 will be mainly described about a difference from frequency characteristic measurement system 1 while the same components as those of frequency characteristic measurement system 1 will be denoted by the same reference numerals as those already described and detailed description thereof will not be described.

Figure 10:
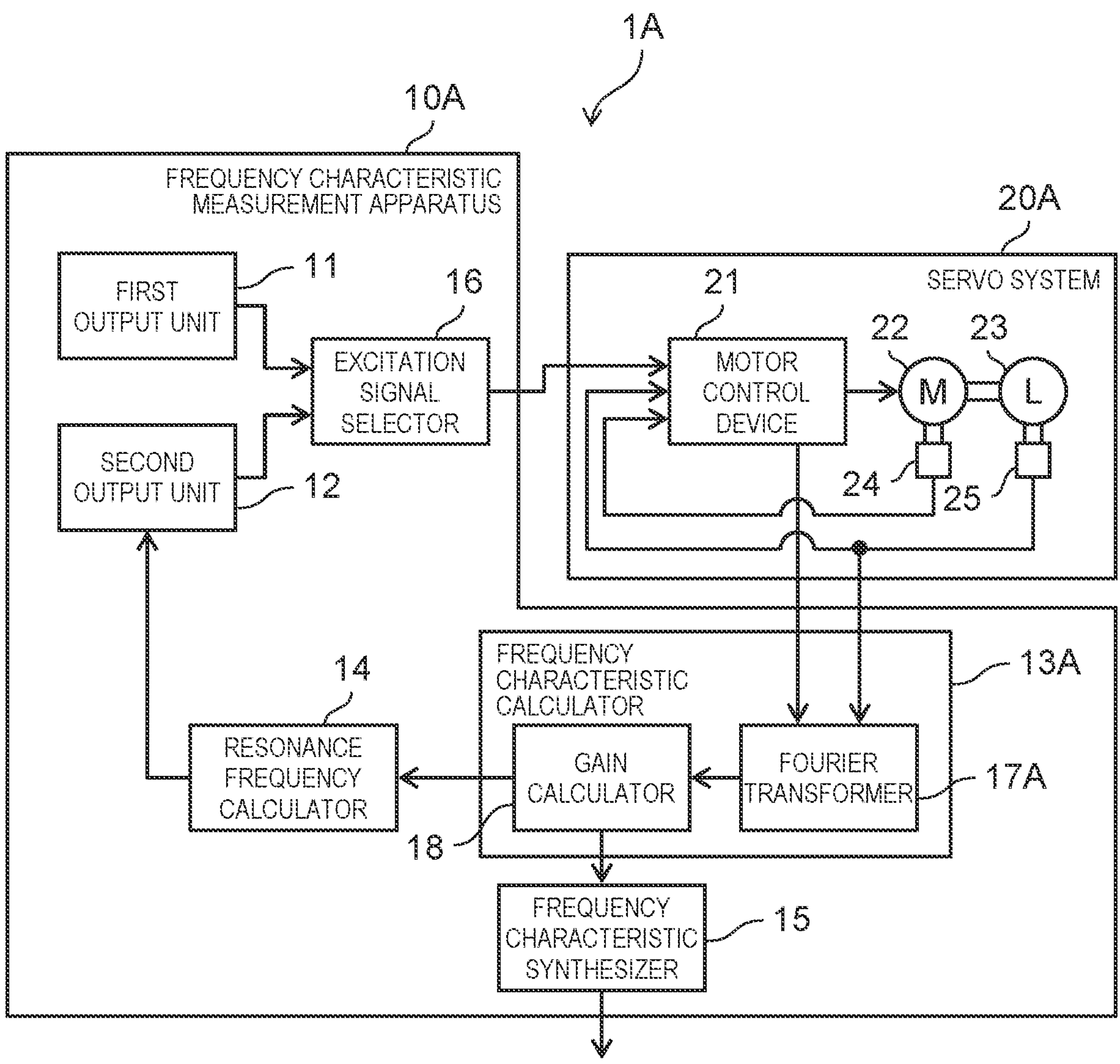
FIG. 10 is a block diagram illustrating a configuration of a frequency characteristic measurement system according to Modification 1.

FIG. 10 is a block diagram illustrating a configuration of frequency characteristic measurement system 1A according to Modification 1.

As illustrated in FIG. 10, frequency characteristic measurement system 1A is configured to be different from frequency characteristic measurement system 1 according to the exemplary embodiment by changing frequency characteristic measurement apparatus 10 to frequency characteristic measurement apparatus 10A and servo system 20 to servo system 20A. Frequency characteristic measurement apparatus 10A is then configured to be different from frequency characteristic measurement apparatus 10 by changing frequency characteristic calculator 13 to frequency characteristic calculator 13A and Fourier transformer 17 to Fourier transformer 17A. Servo system 20A is configured to be different from servo system 20 by adding second state quantity measurement device 25.

Second state quantity measurement device 25 measures a state quantity related to load 23 that is a driven body in servo system 20A, and outputs the measured state quantity related to load 23 as a state signal indicating the state quantity of servo system 20A. Second state quantity measurement device 25 will be here described as a sensor that outputs a state quantity related to load 23 by sensing load 23. That is, the state signal output from second state quantity measurement device 25 will be described in which sensor information indicating a state quantity of load 23 is included, the sensor information being obtained by sensing load 23 that is a driven body in servo system 20A. More specifically, second state quantity measurement device 25 will be described as a sensor that measures a rotational position of load 23 and outputs a state signal indicating the rotational position of load 23. However, second state quantity measurement device 25 is not necessarily limited to the sensor as long as it is a device capable of measuring a state quantity related to load 23 and outputting the measured state quantity related to load 23.

Frequency characteristic calculator 13A calculates frequency characteristics of servo system 20A based on an excitation signal input to servo system 20A and a state signal acquired from servo system 20A having received the excitation signal.

More specifically, frequency characteristic calculator 13A calculates frequency characteristics described in items (1) and (2) below.

(1) When a first excitation signal is input to servo system 20A, frequency characteristic calculator 13A calculates a first frequency characteristic of servo system 20A in a first frequency range based on a first input torque command output from motor control device 21 in servo system 20A having received the first excitation signal and the first state signal output from second state quantity measurement device 25 in servo system 20A having received the first excitation signal.

(2) When a second excitation signal is input to servo system 20A, frequency characteristic calculator 13A calculates a second frequency characteristic of servo system 20A in a second frequency range based on a second input torque command output from motor control device 21 in servo system 20A having received the second excitation signal and a second state signal output from second state quantity measurement device 25 in servo system 20A having received the second excitation signal.

As illustrated in FIG. 10, frequency characteristic calculator 13A may be implemented by a configuration including Fourier transformer 17A and gain calculator 18, Fourier transformer 17A being configured to perform Fourier transform on an input torque command output from motor control device 21 and rotational speed of load 23 obtained by time-differentiating a state signal indicating a rotational position of load 23 output from second state quantity measurement device 25, for example.

Consideration

In general, grasping frequency characteristics related to a state quantity of load 23 for a torque command to motor 22 is extremely useful for control, adjustment, and the like of servo system 20A. For this matter, frequency characteristic measurement apparatus 10A having the above configuration is capable of accurately measuring the frequency characteristics described above. Thus, frequency characteristic measurement apparatus 10A having the above configuration is used for control, adjustment, and the like of servo system 20A in an extremely useful manner.

Modification 2

Hereinafter, a frequency characteristic measurement system according to Modification 2 configured by partially changing the configuration of frequency characteristic measurement system 1 according to an exemplary embodiment will be described.

Frequency characteristic measurement system 1 is an example of a configuration for measuring frequency characteristics related to a state quantity of motor 22 in servo system 20. In contrast, a frequency characteristic measurement system according to Modification 2 is an example of a configuration for measuring frequency characteristics related to a state quantity of motor 22 and frequency characteristics related to a state quantity of load 23 that is a driven body in servo system 20B (described later).

Hereinafter, the frequency characteristic measurement system according to Modification 2 will be mainly described about a difference from frequency characteristic measurement system 1 while the same components as those of frequency characteristic measurement system 1 will be denoted by the same reference numerals as those already described and detailed description thereof will not be described.

Figure 11:
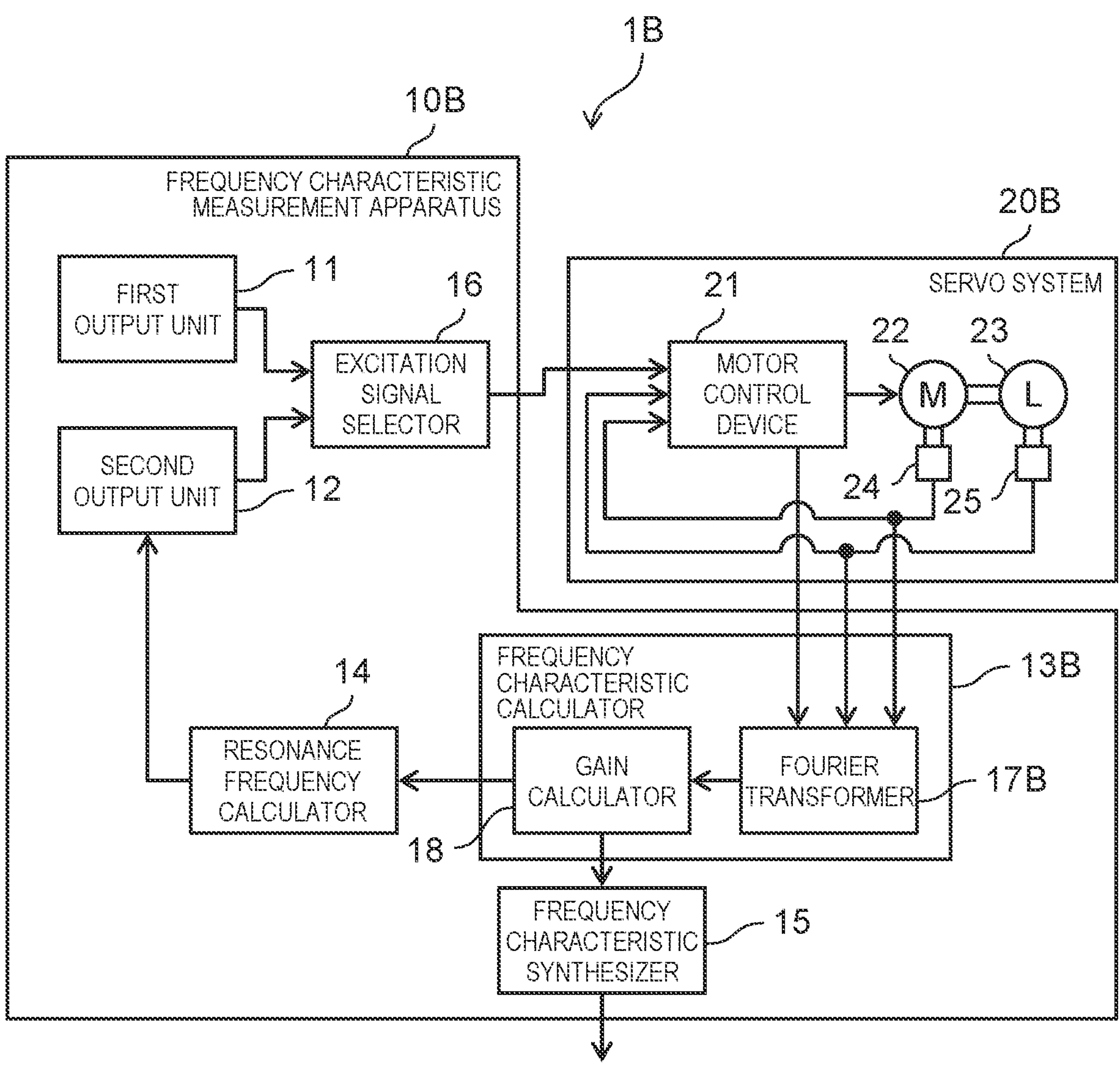
FIG. 11 is a block diagram illustrating a configuration of a frequency characteristic measurement system according to Modification 2.

FIG. 11 is a block diagram illustrating a configuration of frequency characteristic measurement system 1B according to Modification 2.

As illustrated in FIG. 11, frequency characteristic measurement system 1B is configured to be different from frequency characteristic measurement system 1 according to the exemplary embodiment by changing frequency characteristic measurement apparatus 10 to frequency characteristic measurement apparatus 10B and servo system 20 to servo system 20B. Frequency characteristic measurement apparatus 10B is then configured to be different from frequency characteristic measurement apparatus 10 by changing frequency characteristic calculator 13 to frequency characteristic calculator 13B and Fourier transformer 17 to Fourier transformer 17B. Servo system 20B is configured to be different from servo system 20 by adding second state quantity measurement device 25.

Servo system 20B outputs an excitation signal output from motor control device 21, a state signal (referred to below also as a "motor state signal") indicating a state quantity of motor 22, the state signal being output from first state quantity measurement device 24, and a state signal (referred to below also as a "load state signal") indicating a state quantity of load 23, the state signal being output from second state quantity measurement device 25.

Frequency characteristic calculator 13B calculates frequency characteristics (referred to below also as "motor frequency characteristics") related to a state of motor 22 and frequency characteristics (referred to below as "load frequency characteristics") related to a state of load 23 of servo system 20B based on an excitation signal received by servo system 20B and a motor state signal and a load state signal acquired from servo system 20B having received the excitation signal.

More specifically, frequency characteristic calculator 13B calculates frequency characteristics described in items (1) and (2) below.

(1) When a first excitation signal is input to servo system 20B, frequency characteristics shown in items (A) and (B) below are calculated.

(A) A first motor frequency characteristic of servo system 20B in the first frequency range is calculated based on a first input torque command output from motor control device 21 in servo system 20B having received the first excitation signal and a first motor state signal output from first state quantity measurement device 24 in servo system 20B having received the first excitation signal.

(B) A first load frequency characteristic of servo system 20B in the first frequency range is calculated based on a first input torque command output from motor control device 21 in servo system 20B having received the first excitation signal and a first load state signal output from second state quantity measurement device 25 in servo system 20B having received the first excitation signal.

(2) When a second excitation signal is input to servo system 20B, frequency characteristics shown in items (A) and (B) below are calculated.

(A) A second motor frequency characteristic of servo system 20B in the second frequency range is calculated based on a second input torque command output from motor control device 21 in servo system 20B having received the second excitation signal and a second motor state signal output from first state quantity measurement device 24 in servo system 20B having received the second excitation signal.

(B) A second load frequency characteristic of servo system 20B in the second frequency range is calculated based on a second input torque command output from motor control device 21 in servo system 20B having received the second excitation signal and a second load state signal output from second state quantity measurement device 25 in servo system 20B having received the second excitation signal.

As illustrated in FIG. 11, frequency characteristic calculator 13B may be implemented by a configuration including Fourier transformer 17B and gain calculator 18, for example. Fourier transformer 17B performs Fourier transform on the input torque command output from motor control device 21, rotational speed of motor 22, and rotational speed of load 23. The rotational speed of motor 22 is obtained by time-differentiating the motor state signal indicating a rotational position of motor 22 output from first state quantity measurement device 24. The rotational speed of load 23 is obtained by time-differentiating the load state signal indicating a rotational position of load 23 output from second state quantity measurement device 25.

Consideration

Frequency characteristic measurement apparatus 10B having the above configuration is capable of accurately measuring frequency characteristics of servo system 20B related to a state quantity of motor 22 and frequency characteristics related to a state quantity of load 23 that is a driven body.

Modification 3

Hereinafter, a frequency characteristic measurement system according to Modification 3 configured by partially changing the configuration of frequency characteristic measurement system 1 according to an exemplary embodiment will be described.

Frequency characteristic measurement system 1 is an example of a configuration of outputting a first excitation signal once, and measuring a first frequency characteristic based on the first excitation signal output once and a first state signal acquired once from servo system 20 having received the first excitation signal output once. In contrast, the frequency characteristic measurement system according to Modification 3 is an example of a configuration of outputting a first excitation signal multiple times, and measuring a first frequency characteristic based on the respective first excitation signals output multiple times and respective first state signals acquired multiple times from servo system 20 having received the respective first excitation signals output multiple times.

Hereinafter, the frequency characteristic measurement system according to Modification 3 will be mainly described about a difference from frequency characteristic measurement system 1 while the same components as those of frequency characteristic measurement system 1 will be denoted by the same reference numerals as those already described and detailed description thereof will not be described.

Figure 12:
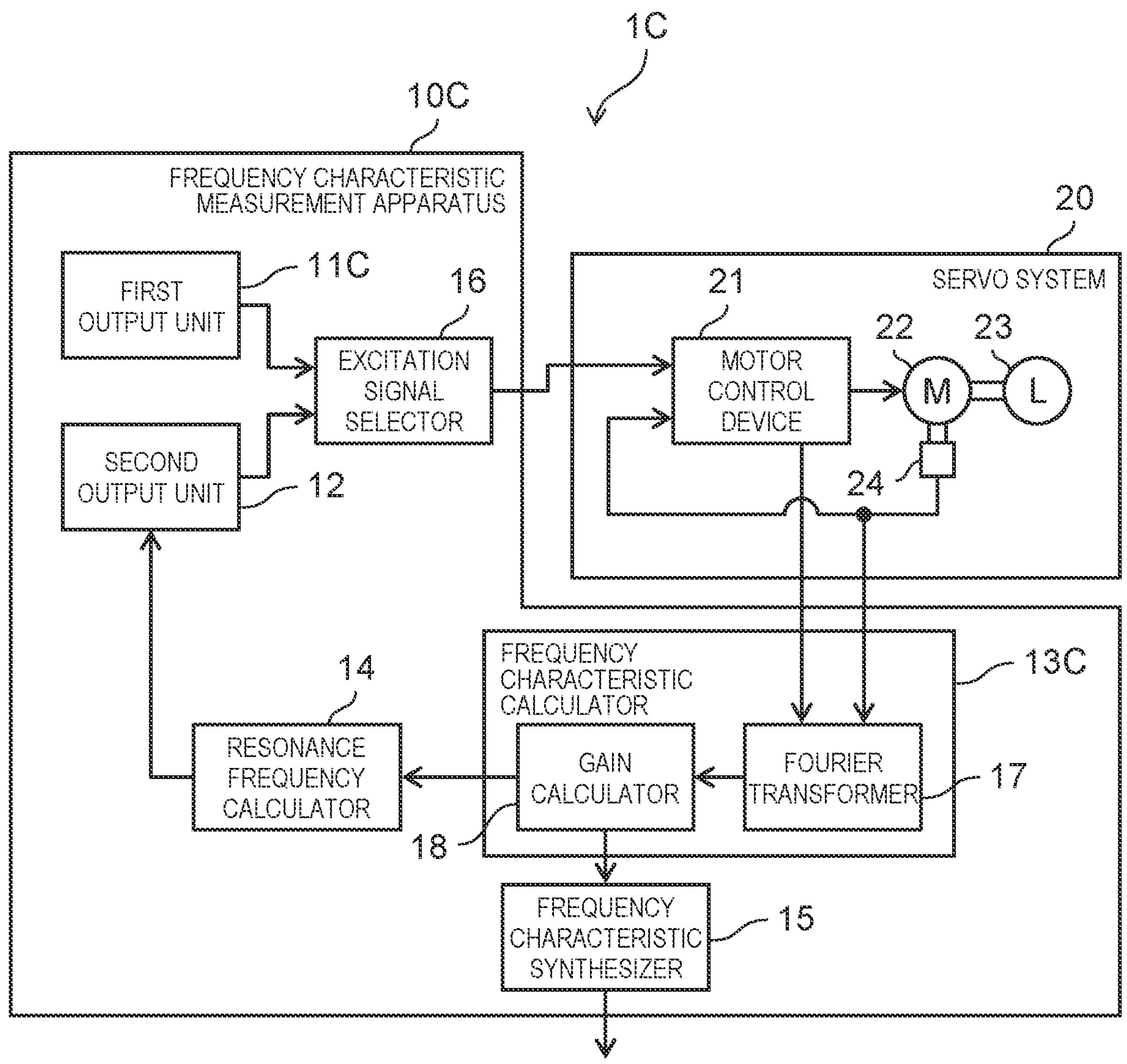
FIG. 12 is a block diagram illustrating a configuration of a frequency characteristic measurement system according to Modification 3.

FIG. 12 is a block diagram illustrating a configuration of frequency characteristic measurement system 1C according to Modification 3.

As illustrated in FIG. 12, frequency characteristic measurement system 1C is configured to be different from frequency characteristic measurement system 1 according to the exemplary embodiment by changing frequency characteristic measurement apparatus 10 to frequency characteristic measurement apparatus 10C. Frequency characteristic measurement apparatus 10C is then configured to be different from frequency characteristic measurement apparatus 10 by changing first output part 11 to first output part 11C and frequency characteristic calculator 13 to frequency characteristic calculator 13C.

First output part 11C outputs the first excitation signal in the first frequency range multiple times.

Frequency characteristic calculator 13C calculates frequency characteristics described in items (1) and (2) below.

(1) When the respective first excitation signals in the first frequency range output multiple times from frequency characteristic measurement apparatus 10C are input to servo system 20 multiple times, the first frequency characteristic of servo system 20 in the first frequency range is calculated based on the respective first excitation signals and the respective first state signals acquired multiple times from servo system 20 having received the respective first excitation signals multiple times.

(2) When a second excitation signal in a second frequency range output from motor control device 21 is input to servo system 20, a second frequency characteristic of servo system 20 in the second frequency range is calculated based on the second excitation signal and a second state signal acquired from the servo system 20 having received the second excitation signal.

More specifically, frequency characteristic calculator 13C calculates frequency characteristics as in items (1) and (2) below.

(1) When the first excitation signal is input to servo system 20 multiple times, frequency characteristic calculator 13C calculates the first frequency characteristic of servo system 20 in the first frequency range based on one of the plurality of first input torque commands output from motor control device 21 in servo system 20 having received the respective first excitation signals multiple times and the respective first state signals output multiple times from first state quantity measurement device 24 in servo system 20 having received the respective first excitation signals multiple times.

(2) When the second excitation signal is input to servo system 20, frequency characteristic calculator 13C calculates the second frequency characteristic of servo system 20 in the second frequency range based on a second input torque command output from motor control device 21 in servo system 20 having received the second excitation signal and a second state signal output from first state quantity measurement device 24 in servo system 20 having received the second excitation signal.

Consideration

In general, when measuring a state quantity of servo system 20 from servo system 20, first state quantity measurement device 24 measures the state quantity including influence of noise superimposed on the state quantity of servo system 20. Thus, the state quantity of servo system 20 measured by first state quantity measurement device 24 may vary by the influence of the superimposed noise every time the state quantity is measured. Meanwhile, the first excitation signal output to servo system 20 is less likely to vary every time the first excitation signal is output.

In contrast, frequency characteristic measurement apparatus 10C having the above configuration outputs the first excitation signal multiple times to measure the first frequency characteristic based on one of the first excitation signals output multiple times and the respective first state signals acquired multiple times from servo system 20 having received the respective first excitation signals multiple times. As a result, frequency characteristic measurement apparatus 10C having the above configuration enables obtaining frequency characteristics of servo system 20 with higher accuracy while reducing the influence of noise in the measurement of the state quantity of servo system 20.

Supplementary

As described above, an example of the technique disclosed in the present application has been described based on the exemplary embodiment and Modifications 1 to 3. However, the present disclosure is not limited to the exemplary embodiment and Modifications 1 to 3. Configurations in which various modifications conceived by those skilled in the art are applied to the present exemplary embodiment or the present modification, and configurations constructed by combining components in different exemplary embodiments or modifications may also be included within the scope of one or more aspects of the present disclosure without departing from the gist of the present disclosure.

An aspect of the present disclosure may be not only frequency characteristic measurement system 1 or the like but also a frequency characteristic measurement method in which characteristic components included in frequency characteristic measurement system 1 or the like are set to constitute steps. Another aspect of the present disclosure may be a computer program that causes a computer to execute each characteristic step included in the frequency characteristic measurement method. Yet another aspect of the present disclosure may be a non-transitory computer-readable recording medium on which the above computer program is recorded.

INDUSTRIAL APPLICABILITY

The present disclosure is widely applicable to systems and the like for measuring frequency characteristics.

REFERENCE MARKS IN THE DRAWINGS

- 1, 1A, 1B, 1C: frequency characteristic measurement system
- 10, 10A, 10B, 10C: frequency characteristic measurement apparatus
- 11, 11C: first output part
- 12: second output part
- 13, 13A, 13B, 13C: frequency characteristic calculator
- 14: resonance frequency calculator
- 15: frequency characteristic synthesizer
- 16: excitation signal selector
- 20, 20A, 20B: servo system
- 21: motor control device
- 22: motor
- 23: load
- 24: first state quantity measurement device
- 25: second state quantity measurement device

The invention claimed is:

1. A frequency characteristic measurement apparatus comprising:

a first output part that outputs a first excitation signal in a first frequency range;

a frequency characteristic calculator that calculates a first frequency characteristic of a servo system in the first frequency range based on the first excitation signal and a first state signal, the first state signal indicating a state quantity of the servo system and being acquired from the servo system having received the first excitation signal;

a resonance frequency calculator that calculates at least one of a resonance frequency or an antiresonance frequency of the servo system based on the first frequency characteristic;

a second output part that outputs a second excitation signal in a second frequency range including at least one of the resonance frequency and the antiresonance frequency calculated by the resonance frequency calculator and belonging to a partial range of the first frequency range, the frequency characteristic calculator being configured to further calculates a second frequency characteristic of the servo system in the second frequency range based on the second excitation signal and a second state signal, the second state signal indicating a state quantity of the servo system and being acquired from the servo system having received the second excitation signal; and a frequency characteristic synthesizer that synthesizes the first frequency characteristic and the second frequency characteristic to calculate a third frequency characteristic of the servo system in the first frequency range.

2. The frequency characteristic measurement apparatus according to claim 1, wherein the first excitation signal is any one of a white noise signal, a multiple sinusoidal signal, a sinusoidal sweep signal, a step signal, and a lamp signal.

3. The frequency characteristic measurement apparatus according to claim 1, wherein the second excitation signal is a multiple sinusoidal signal or a sinusoidal sweep signal.

4. The frequency characteristic measurement apparatus according to claim 1, wherein the frequency characteristic calculator calculates the second frequency characteristic with a frequency resolution finer than a frequency resolution at a time of calculating the first frequency characteristic.

5. The frequency characteristic measurement apparatus according to claim 1, wherein the second output part includes a calculator that calculates an amplitude of the second excitation signal to be output, based on the first frequency characteristic.

6. The frequency characteristic measurement apparatus according to claim 1, wherein the first output part outputs the first excitation signal multiple times, and the frequency characteristic calculator calculates the first frequency characteristic based on the first excitation signal and a plurality of the first state signals acquired from the servo system for each of the first excitation signals output from the first output part multiple times.

7. The frequency characteristic measurement apparatus according to claim 1, wherein the first state signal and the second state signal include sensor information indicating a state quantity of a driven body obtained by sensing the driven body in the servo system.

8. A frequency characteristic measurement method comprising:

a first output step of outputting a first excitation signal in a first frequency range;

a first frequency characteristic calculation step of calculating a first frequency characteristic of a servo system in the first frequency range based on the first excitation signal and a first state signal, the first state signal indicating a state quantity of the servo system and being acquired from the servo system having received the first excitation signal;

a resonance frequency calculation step of calculating at least one of a resonance frequency and an antiresonance frequency of the servo system based on the first frequency characteristic;

a second output step of outputting a second excitation signal in a second frequency range including at least one of the resonance frequency and the antiresonance frequency calculated in the resonance frequency calculation step and belonging to a partial range of the first frequency range;

a second frequency characteristic calculation step of calculating a second frequency characteristic of the servo system in the second frequency range based on the second excitation signal and a second state signal, the second state signal indicating a state quantity of the servo system and being acquired from the servo system having received the second excitation signal; and synthesizing the first frequency characteristic and the second frequency characteristic to calculate a third frequency characteristic of the servo system in the first frequency range.

* * * * *